(No Model.)

J. G. RIPLEY.
HOOF EXPANDER.

No. 475,801. Patented May 31, 1892.

Witnesses.
Lauritz N. Möller
Alice A. Perkins

Inventor.
James G. Ripley
by Alban Andrén
his atty.

UNITED STATES PATENT OFFICE.

JAMES G. RIPLEY, OF BOSTON, MASSACHUSETTS.

HOOF-EXPANDER.

SPECIFICATION forming part of Letters Patent No. 475,801, dated May 31, 1892.

Application filed March 23, 1892. Serial No. 426,057. (No model.)

*To all whom it may concern:*

Be it known that I, JAMES G. RIPLEY, a citizen of the United States, and a resident of Boston, in the county of Suffolk and State of Massachusetts, have invented new and useful Improvements in Hoof-Expanders, of which the following, taken in connection with the accompanying drawings, is a specification.

This invention relates to improvements in hoof-expanders for the purpose of expanding the hoof to prevent and cure contraction; and my invention has for its object the construction of a hoof-expander which may be readily adjustable to suit various sizes of hoofs both as to width and length, as will hereinafter be more fully shown and described, reference being had to the accompanying drawings, wherein—

Figure 1:
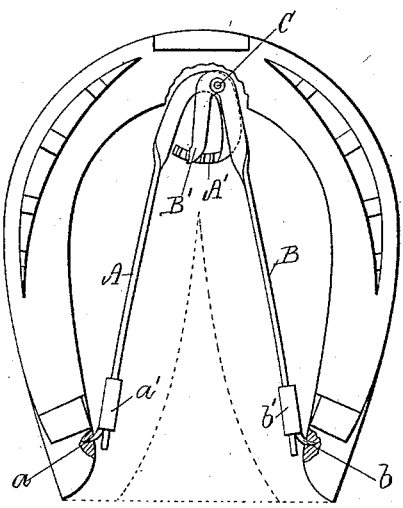
Figure 2:
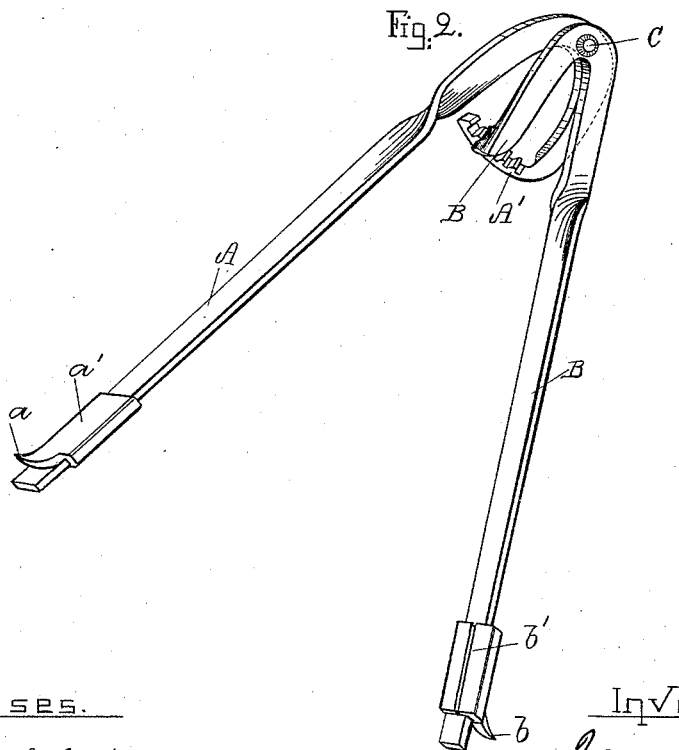

Figure 1 represents a bottom plan view of the expander shown as applied in position between the hoof and the horseshoe, and Fig. 2 represents a detail perspective view of the improved hoof-expander.

Similar letters refer to similar parts wherever they occur on the different parts of the drawings.

The improved hoof-expander consists of a pair of spring-metal arms A and B, which are pivoted together at C, as shown. One of the spring-arms—the one marked A—has attached to it in any suitable manner a toothed ratchet-bar A', adapted to receive a toothed projection or pawl B' on the opposite spring-arm B, as shown in the drawings. It will thus be seen that by swinging the arms A and B more or less apart and locking the pawl B' in any one of the notches on the ratchet A' the outer ends of the arms A and B will be adapted for the expansion of hoofs of various widths.

This, my improved hoof-expander, may be provided with outwardly-projecting prongs on the spring-arms, adapted to enter the inside of the heel; but as hoofs vary in size from toe to heel I provide means for adjusting such prongs on the spring-arms, and for this purpose I attach the prongs $a$ and $b$, not directly to the spring-arms A and B, but to sockets $a'$ and $b'$, which may be slid up and down on the respective spring-arms A and B, according to the size of the heel in the direction of the toe toward the heel, and clamped in position after being adjusted.

The hoof-expander is applied to the hoof by placing the pivoted portion C between the toe of the hoof and the shoe, and the arms A and B are adjusted by means of the ratchet A' and pawl B', according to the width of the hoof, after which the positions of the prongs $a$ and $b$ are adjusted on the spring-arms A and B, according to the length of the hoof from toe to heel, and the arms sprung together to permit the said prongs to enter the inside of the heel.

Having thus fully described the nature, construction, and operation of my invention, I wish to secure by Letters Patent and claim—

1. A hoof-expander consisting of a pair of pronged spring-arms pivoted together, combined with a ratchet and a pawl on said arms for the purpose of adjusting the position of the spring-arms according to the width of the hoof, substantially as specified.

2. A hoof-expander consisting of a pair of spring-arms, combined with prongs, adapted to be adjusted on said arms relative to the size of the hoof from toe to heel, substantially as specified.

3. A hoof-expander consisting of a pair of spring-arms pivoted together, combined with a pawl and ratchet on said arms and longitudinally-adjustable prongs on the latter, substantially as and for the purpose set forth.

In testimony whereof I have signed my name to this specification, in the presence of two subscribing witnesses, on this 22d day of March, A. D. 1892.

JAMES G. RIPLEY.

Witnesses:
 ALBAN ANDRÉN,
 ALICE A. PERKINS.